United States Patent
Craven et al.

(10) Patent No.: US 12,302,879 B2
(45) Date of Patent: May 20, 2025

(54) RATTLE CLAW FISHING LURE AND METHODS OF MAKING AND USING SAME

(71) Applicants: William Craven, Scranton, PA (US); Fred Whitman, Jermyn, PA (US)

(72) Inventors: William Craven, Scranton, PA (US); Fred Whitman, Jermyn, PA (US)

(*) Notice: Subject to any disclaimer, the term of this patent is extended or adjusted under 35 U.S.C. 154(b) by 174 days.

(21) Appl. No.: 18/123,272

(22) Filed: Mar. 18, 2023

(65) Prior Publication Data
US 2023/0329204 A1 Oct. 19, 2023

Related U.S. Application Data

(60) Provisional application No. 63/321,505, filed on Mar. 18, 2022.

(51) Int. Cl.
*A01K 85/01* (2006.01)
*A01K 85/00* (2006.01)

(52) U.S. Cl.
CPC ........ *A01K 85/017* (2022.02); *A01K 85/1827* (2022.02)

(58) Field of Classification Search
CPC ... A01K 85/01; A01K 85/017; A01K 85/1827
See application file for complete search history.

(56) References Cited

U.S. PATENT DOCUMENTS

| | | | | |
|---|---|---|---|---|
| 2,703,945 A | * | 3/1955 | Johnson | A01K 85/01 43/42.36 |
| 3,105,317 A | * | 10/1963 | Fox | A01K 85/16 43/42.3 |
| 5,170,579 A | * | 12/1992 | Hollinger | A01K 85/16 43/42.22 |
| 5,546,694 A | * | 8/1996 | Wilkinson | A01K 85/16 43/42.31 |
| 5,915,944 A | * | 6/1999 | Strunk | A01K 85/00 43/42.26 |
| 6,192,618 B1 | * | 2/2001 | Wackerman | A01K 85/18 43/42.31 |
| 6,195,930 B1 | * | 3/2001 | Sato | A01K 85/18 43/42.3 |

(Continued)

FOREIGN PATENT DOCUMENTS

| KR | 200384466 Y1 | * | 5/2005 |
|---|---|---|---|
| KR | 101838985 B1 | * | 3/2018 |

*Primary Examiner* — Magdalena Topolski
(74) *Attorney, Agent, or Firm* — James R. McDaniel; Lawrence P. Zale; Zale Patent Law, Inc.

(57) ABSTRACT

A rattle claw fishing bait/lure assembly, including a body, a plurality of raised areas located along a length of the body, a plurality of legs operatively connected to first and second sides of the body, and a plurality of claws operatively connected to one end of the body, wherein each of the plurality of claws further includes a compartment located along a portion of each of the plurality of claws, and a plurality of rattles retained within the compartment. To use the rattle claw fishing bait/lure assembly, after the rattle claw fishing bait/lure assembly is attached to a fishing line and cast into the water, the user begins to jig or otherwise move the selected rattle claw fishing bait/lure assembly through the water. The jigging movement will cause the rattles in the compartment to create a rattling sound that will attract the fish.

20 Claims, 2 Drawing Sheets

(56) References Cited

U.S. PATENT DOCUMENTS

| | | | | |
|---|---|---|---|---|
| 6,212,818 B1* | 4/2001 | Huddleston | ............ | A01K 85/00 43/42.31 |
| 6,546,663 B1* | 4/2003 | Signitzer | ................ | A01K 85/00 43/4.5 |
| 6,807,766 B1* | 10/2004 | Hughes | ..................... | A61F 5/48 43/42.22 |
| 7,308,773 B1* | 12/2007 | McNaughton | ......... | A01K 85/01 43/42.26 |
| 7,493,725 B2* | 2/2009 | Sampson | ............... | A01K 85/16 43/42.3 |
| 7,774,974 B1* | 8/2010 | Parks | .................... | A01K 85/01 43/42.24 |
| 8,601,737 B2* | 12/2013 | Beer | ..................... | A01K 85/01 43/42.31 |
| 9,095,128 B2* | 8/2015 | Mancini | ................. | A01K 85/01 |
| 9,474,257 B1* | 10/2016 | McGilvry | .............. | A01K 85/02 |
| 9,635,841 B2* | 5/2017 | Choi | ..................... | A01K 85/01 |
| 10,021,863 B2* | 7/2018 | Friedman | ................ | A01K 97/00 |
| 10,064,399 B2* | 9/2018 | Steer | ..................... | A01K 85/02 |
| 2014/0250763 A1* | 9/2014 | Hrncir | ................... | A01K 85/01 43/42.15 |

* cited by examiner

RATTLE CLAW FISHING LURE AND METHODS OF MAKING AND USING SAME

CROSS-REFERENCE TO RELATED APPLICATION

This application claims benefit of U.S. Patent Application No. 63/321,505, filed on Mar. 18, 2022, the disclosure of which is hereby incorporated by reference in its entirety to provide continuity of disclosure to the extent such a disclosure is not inconsistent with the disclosure herein.

FIELD OF THE INVENTION

The present invention is generally related to a soft fishing bait or lure that is shaped and colored to resemble a crawfish. The fishing bait or lure includes beads located with compartments attached to the claws of the bait or lure such that the beads are allowed to move around within the compartments on the claws in order to create a "rattling" noise that emanates from the claws. The "rattling" is created when the bait or lure is moved up and down ("jigged" up and down) while being submerged in the water. The "rattling" noise is used to attract fish to the bait or lure.

BACKGROUND OF THE INVENTION

Prior to the present invention, as set forth in general terms above and more specifically below, it is known, to use a variety of fishing baits and lures to attract fish. It is also known that different colors and shapes of the baits and lures can utilized to attract fish. Finally, it is known that different sounds emanating from the baits and lures can be used to attract fish.

As shown in FIGS. 1a and 1b, there is illustrated a known fishing bait or lure 2. The fishing bait or lure includes a hook assembly 4 and a rattle assembly 8. In particular, hook assembly 4, typically, includes a conventional hook 6 and a rattle assembly retainer 7. The hook 6 and a rattle assembly retainer 7 typically are constructed of any suitable, durable, rust resistant metallic or other similar material.

With respect to the rattle assembly 8, rattle assembly 8, typically, includes a plurality of rings 10 and a shaft 12. The rings 10 and shaft 12 typically are constructed of any suitable, durable rust resistant metallic or other similar material. Usually, a number of rings 10 is determined that will provide the desired "rattling" noise and that desired number of rings 10 is placed on shaft. 12.

After the number of rings 10 has been placed on shaft 12, the rattle assembly 8 is attached to hook assembly 4 by locating an opening 12 on rattle assembly 8 over the rattle assembly retainer 7.

While this known fishing bait or lure is capable of creating a "rattling" noise when the bait or lure is moved up and down ("jigged" up and down) while being submerged in the water, there are several disadvantages to using this known type of fishing bait or lure. First, it takes some amount of time to determine the number of rings 10 that are going to be placed on the shaft 12. Secondly, it takes some amount of time to properly secure the rings 10 on the shaft 12. Thirdly, if it is determined that the number of rings 10 needs to be adjusted, the fisherman will have to remove the rattle assembly 8 from the hook assembly 4, and manually adjust the number of rings 10 on the shaft 12. Fourthly, if the known fishing bait or lure gets snagged or otherwise caught on debris while the fishing bait or lure 2 is being used, it is quite possible that the fishing line attached to the known fishing bait or lure 2 may snap which will cause the known fishing bait or lure 2 to become disconnected from the fishing line and, therefore, lost. In this case, the fisherman will then have to start over by setting up a new fishing bait or lure 2 that includes the hook assembly 4 and the rattle assembly 8 which will require some amount of time. Furthermore, the need to replace the lost hook assembly 4 and the rattle assembly 8 will add to the cost of the fishing trip.

It is a purpose of this invention to fulfill these and other needs in the fishing bait or lure art in a manner more apparent to the skilled artisan once given the following disclosure.

The preferred fishing bait or lure, according to various embodiments of the present invention, offers the following advantages: ease of use; portability; the ability to create a rattling noise to attract fish; the ability to easily attach or remove the fishing bait or lure to/from the fishing line; the ability to adjust the amount of rattle in the fishing bait or lure to attract fish; the ability to provide a fishing bait or lure design that is capable of attracting fish; the ability to provide the fishing bait or lure in different colors; and reduced cost in having to replace the fishing bait or lure. In fact, in many of the preferred embodiments, these advantages are optimized to an extent that is considerably higher than heretofore achieved in prior, known fishing baits or lures.

BRIEF DESCRIPTION OF THE DRAWINGS

The above-mentioned features and steps of the invention and the manner of attaining them will become apparent, and the invention itself will be best understood by reference to the following description of the embodiments of the invention in conjunction with the accompanying drawings, wherein like characters represent like parts throughout the several views and in which.

DETAILED DESCRIPTION OF THE PREFERRED EMBODIMENTS OF THE INVENTION

In order to address the shortcomings of the prior, known fishing baits or lures, it would be desirable to utilize a soft fishing bait or lure that is shaped and colored to resemble a crawfish. The fishing bait or lure includes beads located with compartments attached to the claws of the bait or lure such that the beads are allowed to move around within the compartments on the claws in order to create a "rattling" noise that emanates from the claws. The "rattling" is created when the bait or lure is moved up and down ("jigged" up and down) while being submerged in the water. The "rattling" noise is used to attract fish to the bait or lure.

Figures 1A, 1B:
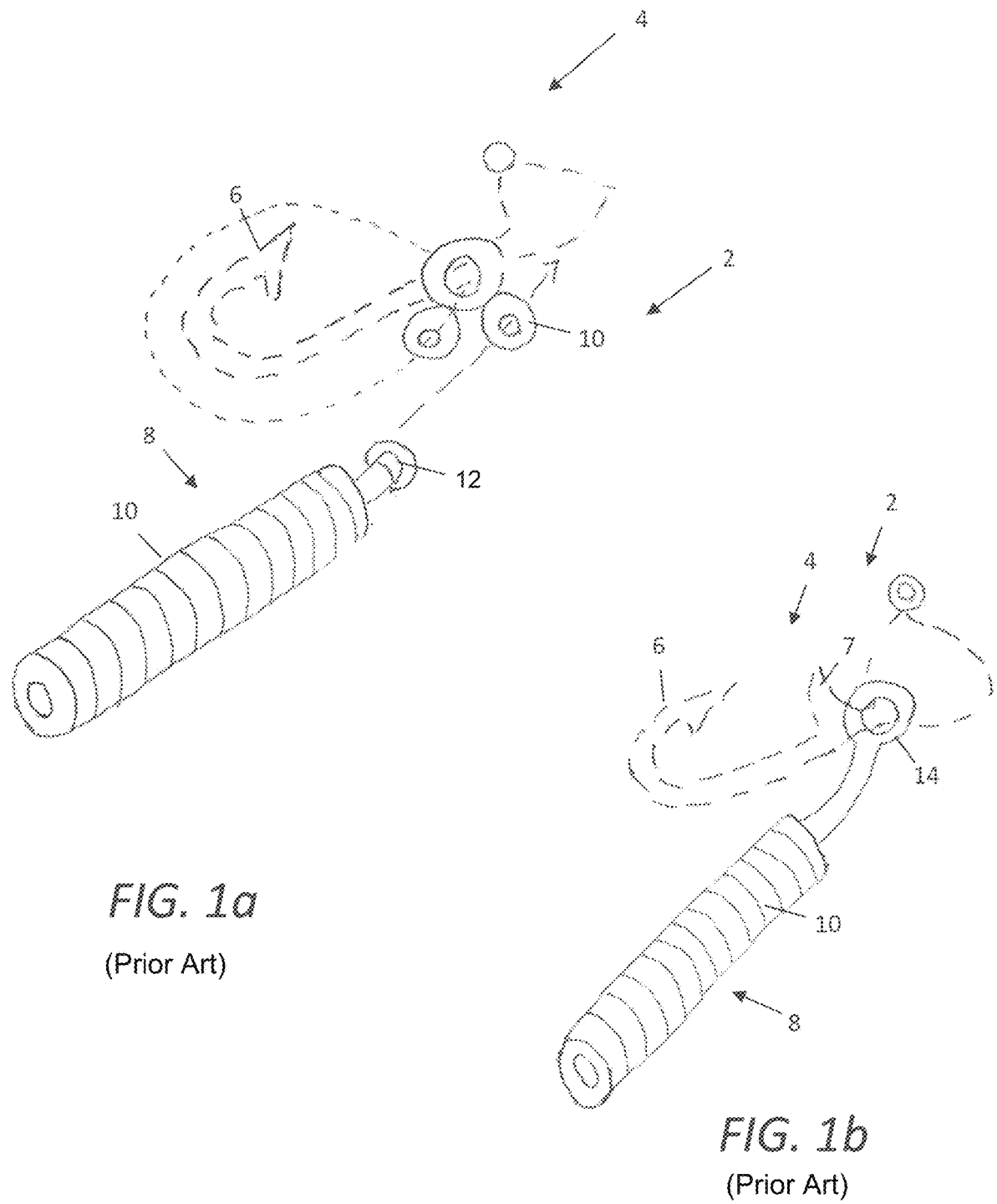
FIGS. 1a and 1b are a schematic illustrations of a known rattle fishing bait or lure, constructed according to the prior art.
Figure 2:
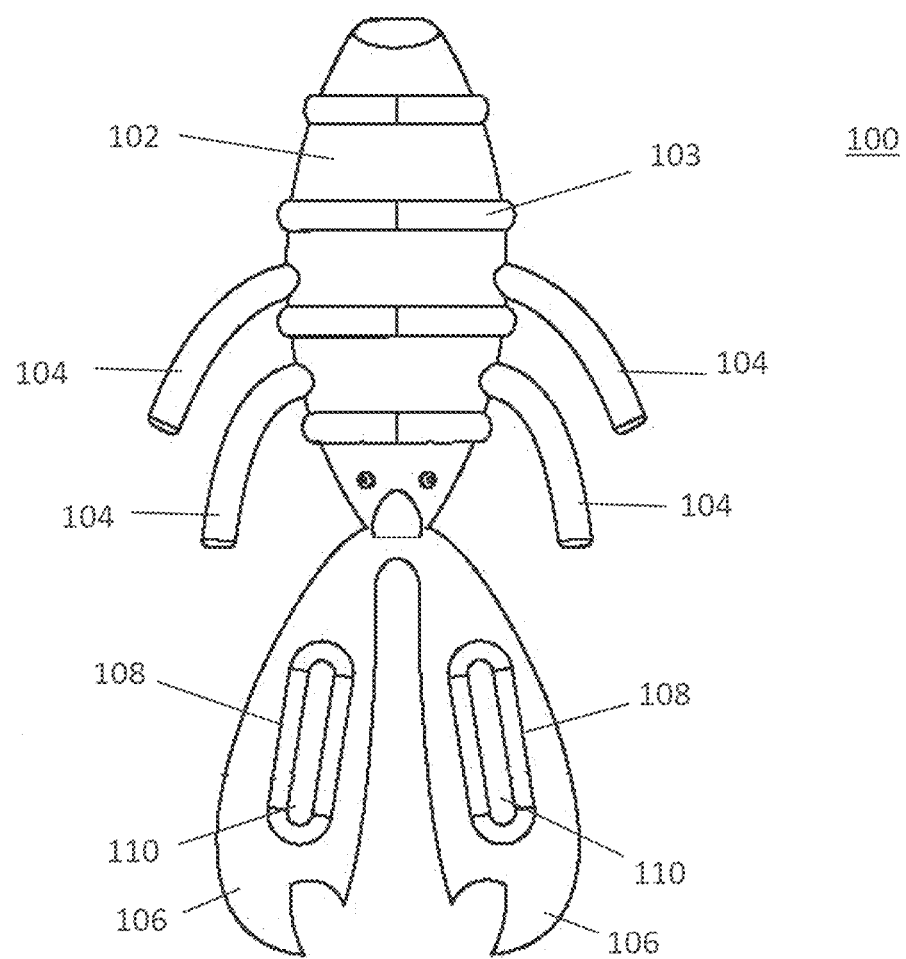
FIG. 2 is a schematic, top view of a rattle fishing bait or lure, constructed according to the present invention.
Figure 3:
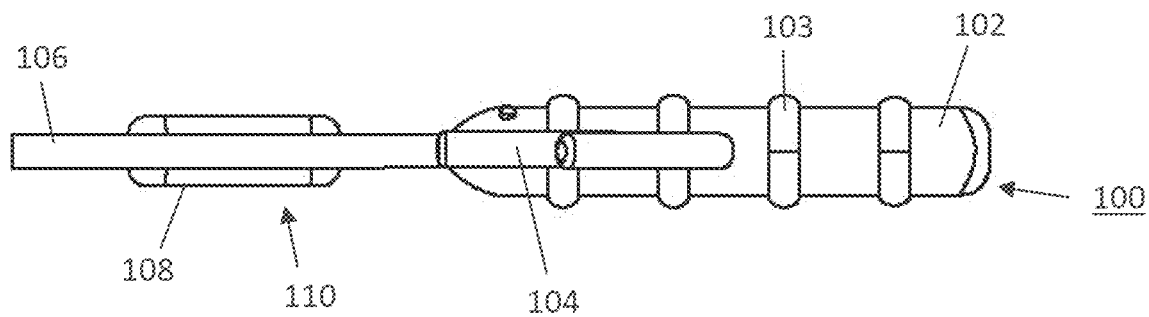
FIG. 3 is a schematic, side view of the rattle fishing bait or lure, constructed according to the present invention.

Reference is made now to FIGS. 2 and 3, where there are illustrated rattle claw fishing bait or lure assembly 100. Rattle claw fishing bait or lure assembly 100 includes, in part, body 102, raised areas or ribs 103, legs 104, claws 106, compartments 108, and rattles 110. Preferably, rattle claw fishing bait or lure assembly 100 should be sized, shaped, and colored to resemble a crawfish or other similar type of bait commonly used for fishing.

With respect to body 102, raised areas or ribs, 103, legs 104, claws 106, and compartments 108, preferably, these components of rattle claw fishing bait or lure assembly 100 should be constructed of any suitable, durable, soft, pliable, water-resistant, light weight, UV resistant, high strength, rust resistant polymeric or other similar material. Also, it is to be understood that the body 102, raised areas or ribs 103, legs 104, claws 106, and compartments 108 can be constructed of various colors which are known to attract fish. Furthermore, the size of the body 102, raised areas or ribs 103, legs 104, claws 106, and compartments 108 can be adjusted to provide various sizes of the rattle claw fishing bait or lure assembly 100. In this manner, various sizes and weights of the rattle claw fishing bait or lure assembly 100 can be constructed in order to allow the fisherman to use the various sizes and weights of the rattle claw fishing bait or lure assembly 100 to catch various sizes of fish. Finally, body 102, raised areas or ribs 103, legs 104, claws 106, and compartments 108 can be formed by such techniques as thermoforming, molding, 3-D printing, pressing or the like.

A unique aspect of the present invention is the use of compartments 108 and rattles 110. In particular, compartments 108 are created in order to retain rattles 110 within the claw section of the rattle claw fishing bait or lure assembly 100. Also, the size of the compartment 108 can be adjusted to hold different amounts and/or sizes of rattles 110. In this manner, the amount of rattle and the particular rattle sound emanating from the rattle claw fishing bait or lure assembly 100 can be adjusted. Finally, preferably, rattles 110 are constructed of any suitable, durable, lightweight, high strength, impact resistant, rust resistant material such as glass or metal.

A unique aspect of the present invention is that the ribs 103 are used to create more turbulence in the water as the rattle claw fishing bait or lure assembly 100 is "jigged" through the water.

Construction of Rattle Claw Fishing Bait or Lure Assembly

In order to construct rattle claw fishing bait or lure assembly 100, attention is directed to FIGS. 2 and 3. Initially, the size of the rattle claw fishing bait or lure assembly 100 is determined. This size will determine the size of compartments 108 that will be located on the claws of the rattle claw fishing bait or lure assembly 100.

After size of the compartments 108 have been determined, the number and/or size of rattles 110 will be determined. As discussed above, the number and/or size of the rattles 110 can be adjusted in order to adjust that amount and type of rattle noise that will be emanated from the rattle claw fishing bait or lure assembly 100.

Once the size of the compartments 108 is determined, the compartment 108 is located on each of the claws of the rattle claw fishing bait or lure assembly 100. The compartments 108 are embedded into the claw area of the rattle claw fishing bait or lure assembly 100. It is to be understood that the compartments 108 should be retained on the claws of the rattle claw fishing bait or lure assembly 100 so that the rattles 110 remain dry and are able to freely move around and "rattle" within the compartment 108.

Once the compartments 108 have been attached to the claws of rattle claw fishing bait or lure assembly 100, the rattle claw fishing bait or lure assembly 100 is ready for use.

Using Rattle Claw Fishing Bait or Lure Assembly

In order to use rattle claw fishing bait or lure assembly 100, attention is directed to FIGS. 2 and 3. Initially, the user determines the size and color of the rattle claw fishing bait or lure assembly 100 that is going to be used. In particular, the user will determine the type of fish that the fisherman is going to attempt to catch and try to match up a particular rattle claw fishing bait or lure assembly 100 that should be able to attract that type of fish.

The use then conventionally attaches the selected rattle claw fishing bait or lure assembly 100 to the conventional fishing line (not shown).

Once the selected rattle claw fishing bait or lure assembly 100 has been attached to the fishing line, the user then can conventionally cast the selected rattle claw fishing bait or lure assembly 100 into the water.

After the selected rattle claw fishing bait or lure assembly 100 has entered the water for a particular amount of time, the user begins to "jig" or otherwise move the selected rattle claw fishing bait or lure assembly 100 through the water. The "jigging" movement will cause the rattles 110 in the compartments 108 of the rattle claw fishing bait or lure assembly 100 to create a "rattling" sound that will attract the fish.

As discussed above, if the user is not successful in attracting fish with the selected rattle claw fishing bait or lure assembly 100, the user may then replace the selected rattle claw fishing bait or lure assembly 100 with another rattle claw fishing bait or lure assembly 100 that has a different color and/or a different size of compartments 108 (which created a different "rattle" noise pattern).

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower." "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety.

The applicant reserves the right to physically incorporate into this specification any and all materials and information from any such patents, publications. scientific articles, web sites, electronically available information, and other referenced materials or documents to the extent such incorporated materials and information are not inconsistent with the description herein.

All of the features disclosed in this specification may be combined in any combination. Thus, unless expressly stated otherwise, each feature disclosed is only an example of a generic series of equivalent or similar features.

The specific methods and compositions described herein are representative of preferred embodiments and are exemplary and not intended as limitations on the scope of the invention. Other objects, aspects, and embodiments will occur to those skilled in the art upon consideration of this specification and are encompassed within the spirit of the invention. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps, and that they are not necessarily restricted to the orders of steps indicated herein.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other modifications and implementations will occur to those skilled in the art without departing from the spirit and the scope of the invention. Accordingly, the description hereinabove is not intended to limit the invention.

Therefore, provided herein is a new and improved fishing bait or lure, which according to various embodiments of the present invention, offers the following advantages: ease of use; portability; the ability to create a rattling noise to attract fish; the ability to easily attach or remove the fishing bait or lure to/from the fishing line; the ability to adjust the amount of rattle in the fishing bait or lure to attract fish; the ability to provide a fishing bait or lure design that is capable of attracting fish; the ability to provide the fishing bait or lure in different colors; and reduced cost in having to replace the fishing bait or lure.

In fact, in many of the preferred embodiments, these advantages of ease of use, portability, the ability to create a rattling noise to attract fish, the ability to easily attach or remove the fishing bait or lure to/from the fishing line, the ability to adjust the amount of rattle in the fishing bait or lure to attract fish, the ability to provide a fishing bait or lure design that is capable of attracting fish, the ability to provide the fishing bait or lure in different colors, and reduced cost in having to replace the fishing bait or lure are optimized to an extent that is considerably higher than heretofore achieved in prior, known fishing baits and/or lures.

We claim:

1. A rattle claw fishing bait/lure assembly, comprising:
a body;
a plurality of raised areas located along a length of the body;
a plurality of legs operatively connected to first and second sides of the body; and
a plurality of claws operatively connected to one end of the body,
wherein each of the plurality of claws is further comprised of:
a compartment located along a portion of each of the plurality of claws, and
a rattle retained within the compartment.

2. The rattle claw fishing bait/lure assembly, according to claim 1, wherein the rattle claw fishing bait/lure assembly is sized, shaped, and colored to resemble a crawfish.

3. The rattle claw fishing bait/lure assembly, according to claim 1, wherein the body, the plurality of raised areas, the plurality of legs, the plurality of claws, and the compartment are constructed of a durable, soft, pliable, water-resistant, light weight, UV resistant, high strength, and rust resistant polymeric material.

4. The rattle claw fishing bait/lure assembly, according to claim 1, wherein the body, the plurality of raised areas, the plurality of legs, the plurality of claws, and the compartment are constructed of various colors which are known to attract fish.

5. The rattle claw fishing bait/lure assembly, according to claim 1, wherein a size of the body, the plurality of raised areas, the plurality of legs, the plurality of claws, and the compartment can be adjusted to provide various sizes of the rattle claw fishing bait/lure assembly.

6. The rattle claw fishing bait/lure assembly, according to claim 1, wherein a size and number of the rattle can be adjusted.

7. The rattle claw fishing bait/lure assembly, according to claim 1, wherein the rattle is constructed of a durable, lightweight, high strength, impact resistant, and rust resistant material.

8. A method of constructing a rattle claw fishing bait/lure assembly, comprising:
providing a body;
attaching a plurality of raised areas along a length of the body;
attaching a plurality of legs to first and second sides of the body; and
attaching a plurality of claws to one end of the body to form the rattle claw fishing bait/lure assembly, wherein each of the plurality of claws is further comprised of;
  a compartment located along a portion of each of the plurality of claws, and
  a rattle retained within the compartment.

9. The method, according to claim 8, wherein the rattle claw fishing bait/lure assembly is sized, shaped, and colored to resemble a crawfish.

10. The method, according to claim 8, wherein the body, the plurality of raised areas, the plurality of legs, the plurality of claws, and the compartment are constructed of a durable, soft, pliable, water-resistant, light weight, UV resistant, high strength, and rust resistant polymeric material.

11. The method, according to claim 8, wherein the body, the plurality of raised areas, the plurality of legs, the plurality of claws, and the compartment are constructed of various colors which are known to attract fish.

12. The method, according to claim 8, wherein a size of the body, the plurality of raised areas, the plurality of legs, the plurality of claws, and the compartment can be adjusted to provide various sizes of the rattle claw fishing bait/lure assembly.

13. The method, according to claim 8, wherein a size and number of the rattle can be adjusted.

14. The method, according to claim 8, wherein the rattle is constructed of a durable, lightweight, high strength, impact resistant, and rust resistant material.

15. A method of using a rattle claw fishing bait/lure assembly, comprising:
  providing a body;
  attaching a plurality of raised areas along a length of the body;
  attaching a plurality of legs to first and second sides of the body;
  attaching a plurality of claws to one end of the body to form the rattle claw fishing bait/lure assembly,
  wherein each of the plurality of claws is further comprised of;
    a compartment located along a portion of each of the plurality of claws, and
    a rattle rattles retained within the compartment;
  attaching the rattle claw fishing bait/lure assembly to a fishing line;
  casting the rattle claw fishing bait/lure assembly into a body of water; and
  moving the rattle claw fishing bait/lure assembly through the water to cause the rattle in the compartment of the rattle claw fishing bait/lure assembly to create a rattling sound that will attract fish.

16. The method, according to claim 15, wherein the rattle claw fishing bait/lure assembly is sized, shaped, and colored to resemble a crawfish.

17. The method, according to claim 15, wherein the body, the plurality of raised areas, the plurality of legs, the plurality of claws, and the compartment are constructed of a durable, soft, pliable, water-resistant, light weight, UV resistant, high strength, and rust resistant polymeric material.

18. The method, according to claim 15, wherein the body, the plurality of raised areas, the plurality of legs, the plurality of claws, and the compartment are constructed of various colors which are known to attract fish.

19. The method, according to claim 15, wherein a size of the body, the plurality of raised areas, the plurality of legs, the plurality of claws, and the compartment can be adjusted to provide various sizes of the rattle claw fishing bait/lure assembly.

20. The method, according to claim 15, wherein a size and number of the rattle can be adjusted.

* * * * *